US012565845B1

(12) United States Patent
Sanzari et al.

(10) Patent No.: US 12,565,845 B1
(45) Date of Patent: Mar. 3, 2026

(54) DUAL AIR SOURCE BEARING ASSEMBLY HOUSING FOR AN AIRCRAFT PROPULSION SYSTEM

(71) Applicant: Pratt & Whitney Canada Corp., Longueuil (CA)

(72) Inventors: Lorenzo Sanzari, Montreal (CA); Guy Lefebvre, St-Bruno (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 18/819,149

(22) Filed: Aug. 29, 2024

(51) Int. Cl.
| | |
|---|---|
| *F01D 25/16* | (2006.01) |
| *B64D 33/02* | (2006.01) |
| *F16C 33/02* | (2006.01) |

(52) U.S. Cl.
CPC ........... *F01D 25/162* (2013.01); *B64D 33/02* (2013.01); *F16C 33/02* (2013.01); *F05D 2220/323* (2013.01); *F05D 2240/50* (2013.01); *F16C 2360/23* (2013.01)

(58) Field of Classification Search
CPC .... F01D 17/162; F01D 25/16; F05D 2240/50; F02C 7/06
See application file for complete search history.

(56) References Cited

U.S. PATENT DOCUMENTS

| | | | |
|---|---|---|---|
| 4,645,415 A | 2/1987 | Hovan | |
| 9,279,341 B2 | 3/2016 | Durocher | |
| 10,047,677 B2 | 8/2018 | Glahn | |
| 11,391,179 B2 * | 7/2022 | Lefebvre | ............... F01D 25/162 |
| 11,466,590 B1 | 10/2022 | St-Laurent | |
| 11,828,183 B2 | 11/2023 | Levisse | |
| 11,905,841 B1 | 2/2024 | Glahn | |
| 2013/0174574 A1 | 7/2013 | Heaton | |
| 2017/0211417 A1 | 7/2017 | Duffy | |
| 2017/0314468 A1 | 11/2017 | Wotzak | |
| 2024/0263567 A1 | 8/2024 | Glahn | |

FOREIGN PATENT DOCUMENTS

| | | |
|---|---|---|
| CN | 114542205 B | 11/2022 |
| CN | 115217536 B | 12/2022 |

OTHER PUBLICATIONS

EP Search Report for EP Patent Application No. 25199143.6 dated Jan. 23, 2026.

* cited by examiner

*Primary Examiner* — Michael L Sehn
(74) *Attorney, Agent, or Firm* — Getz Balich LLC

(57) ABSTRACT

An engine includes a rotational assembly and a bearing assembly. The rotational assembly includes a shaft rotatable about a rotational axis. The bearing assembly includes a housing and a bearing. The housing surrounds and forms a bearing compartment. The housing includes a housing body extending circumferentially about the rotational axis. The housing body forms a first air flow path and a second air flow path. The first air flow path extends from a first inlet plenum to a first outlet plenum. The second air flow path extends from a second inlet plenum to a second outlet plenum. The second air flow path is disposed between and separating the first air flow path and the bearing compartment. The bearing is disposed within the bearing compartment. The bearing is rotationally engaged with the shaft.

16 Claims, 6 Drawing Sheets

DUAL AIR SOURCE BEARING ASSEMBLY HOUSING FOR AN AIRCRAFT PROPULSION SYSTEM

TECHNICAL FIELD

This disclosure relates bearing assemblies for an engine of an aircraft propulsion system and, more particularly, to bearing compartment housings.

BACKGROUND OF THE ART

Rotational equipment, such as those typically found in an engine for an aircraft propulsion system, may include one or more bearing assemblies configured to rotationally support components of the rotational equipment. Various types and configurations of bearing assemblies are known in the art. While these known bearing assemblies may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an engine for an aircraft propulsion system includes a rotational assembly and a bearing assembly. The rotational assembly includes a shaft. The shaft is rotatable about a rotational axis. The bearing assembly includes a bearing compartment housing and at least one bearing. The bearing compartment housing surrounds and forms a bearing compartment. The bearing compartment housing includes a housing body. The housing body extends circumferentially about the rotational axis. The housing body extends axially between and to a first axial housing end and a second axial housing end. The housing body forms a first air flow path and a second air flow path through the bearing compartment housing. The first air flow path extends through the housing body from a first inlet plenum of the first air flow path to a first outlet plenum of the first air flow path. The first air flow path is connected in fluid communication with a first air source. The second air flow path extends through the housing body from a second inlet plenum of the second air flow path to a second outlet plenum of the second air flow path. The second air flow path is disposed between and separating the first air flow path and the bearing compartment. The second air flow path is connected in fluid communication with a second air source. The at least one bearing is mounted to the housing body and disposed within the bearing compartment. The at least one bearing is rotationally engaged with the shaft.

In any of the aspects or embodiments described above and herein, the bearing assembly may further include a first bearing seal and a second bearing seal. The first bearing seal may be disposed at the first axial housing end. The second bearing seal may be disposed at the second axial housing end. The first bearing seal and the second bearing seal may further form the bearing compartment. The first bearing seal and the second bearing seal may be disposed at the second air flow path.

In any of the aspects or embodiments described above and herein, the engine may further include a compressor section. The second air flow path may be connected in fluid communication with the compressor section at the second air source. The housing body may be configured to direct a second compressed bleed air from the compressor section, through the second air flow path, and into the bearing compartment past the first bearing seal and the second bearing seal.

In any of the aspects or embodiments described above and herein, the engine may further include a compressor section and a turbine section. The first air flow path may be connected in fluid communication with the compressor section at the first air source. The first outlet plenum may be connected in fluid communication with the turbine section. The housing body may be configured to direct a first compressed bleed air from the compressor section to the turbine section along the first air flow path.

In any of the aspects or embodiments described above and herein, the second air flow path may be connected in fluid communication with the compressor section at the second air source. The housing body may be configured to direct a second compressed bleed air from the compressor section, through the second air flow path, and into the bearing compartment. The second compressed bleed air may be a different pressure than the first compressed bleed air.

In any of the aspects or embodiments described above and herein, the first compressed bleed air may have a greater pressure than the second compressed bleed air.

In any of the aspects or embodiments described above and herein, the first air flow path may be independent of the second air flow path through the bearing compartment housing.

In any of the aspects or embodiments described above and herein, each of the first inlet plenum, the first outlet plenum, the second inlet plenum, and the second outlet plenum may be an annular plenum.

In any of the aspects or embodiments described above and herein, the first air flow path may include a plurality of first air flow path feed holes connecting the first inlet plenum in fluid communication with the first outlet plenum.

In any of the aspects or embodiments described above and herein, the bearing compartment housing may include at least one feed hole plug. The plurality of first air flow path feed holes may include a plurality of first feed holes and a plurality of second feed holes connecting the first inlet plenum in fluid communication with the first outlet plenum. The plurality of first feed holes may include at least one obstructed feed hole and at least one unobstructed feed hole. Each of the at least one feed hole plug may be disposed within a respective one of the at least one obstructed feed hole to obstruct air flow through the respective one of the at least one obstructed feed hole along the first air flow path.

In any of the aspects or embodiments described above and herein, the second air flow path may include a plurality of second air flow path feed holes connecting the second inlet plenum in fluid communication with the second outlet plenum.

According to another aspect of the present disclosure, an engine for an aircraft propulsion system includes a compressor section, a turbine section, a rotational assembly, and a bearing assembly. The compressor section includes a first air source and a second air source. The rotational assembly includes a bladed compressor rotor for the compressor section, a bladed turbine rotor for the turbine section, and a shaft interconnecting the bladed compressor rotor and the bladed turbine rotor. The rotational assembly is rotatable about a rotational axis. The bearing assembly including a bearing compartment housing and at least one bearing. The bearing compartment housing surrounds and forms a bearing compartment. The bearing compartment housing includes a housing body. The housing body extends circumferentially about the rotational axis. The housing body extends axially between and to a first axial housing end and a second axial housing end. The housing body forms a first air flow path and a second air flow path through the bearing compartment housing. The first air flow path extends through the housing body from a first inlet plenum of the first air flow path to a first outlet plenum of the first air flow path. The first air flow path is connected in fluid communication with and between the first air source and the turbine section. The second air flow path extends through the housing body from a second inlet plenum of the second air flow path to a second outlet plenum of the second air flow path. The second air flow path is connected in fluid communication with and between the second air source and the bearing compartment. The first air flow path is independent of the second air flow path through the bearing compartment housing. The at least one bearing is mounted to the housing body and disposed within the bearing compartment. The at least one bearing is rotationally engaged with the shaft.

In any of the aspects or embodiments described above and herein, the bearing assembly may further include a first bearing seal and a second bearing seal. The first bearing seal may be disposed at the first axial housing end. The second bearing seal may be disposed at the second axial housing end. The first bearing seal and the second bearing seal may further form the bearing compartment. The first bearing seal and the second bearing seal may be disposed at the second air flow path.

In any of the aspects or embodiments described above and herein, the first air flow path may be connected in fluid communication with the first air source at a first position of the compressor section to receive a first compressed bleed air. The second air flow path may be connected in fluid communication with the second air source at a second position of the compressor section, upstream of the first position, to receive a second compressed bleed air.

In any of the aspects or embodiments described above and herein, the first compressed bleed air may have a greater pressure than the second compressed bleed air.

In any of the aspects or embodiments described above and herein, the first air flow path may include a plurality of first air flow path feed holes connecting the first inlet plenum in fluid communication with the first outlet plenum.

In any of the aspects or embodiments described above and herein, the second air flow path may include a plurality of second air flow path feed holes connecting the second inlet plenum in fluid communication with the second outlet plenum.

According to another aspect of the present disclosure, an engine for an aircraft propulsion system includes a rotational assembly and a bearing assembly. The rotational assembly includes a shaft. The shaft is rotatable about a rotational axis. The bearing assembly includes a bearing compartment housing, at least one bearing, a first bearing seal, and a second bearing seal. The bearing compartment housing surrounds and forms a bearing compartment. The bearing compartment housing includes a housing body. The housing body extends circumferentially about the rotational axis. The housing body extends axially between and to a first axial housing end and a second axial housing end. The housing body extends radially between and to an inner radial end and an outer radial end. The housing body forms a first air flow path and a second air flow path through the bearing compartment housing. The first air flow path extends through the housing body from a first inlet plenum of the first air flow path to a first outlet plenum of the first air flow path. The first air flow path is connected in fluid communication with a first air source. The second air flow path extends through the housing body from a second inlet plenum of the second air flow path to a second outlet plenum of the second air flow path. The second air flow path is disposed radially between the first air flow path and the bearing compartment from the second inlet plenum to the second outlet plenum. The second air flow path is connected in fluid communication with a second air source. The at least one bearing is mounted to the housing body and disposed within the bearing compartment. The at least one bearing is rotationally engaged with the shaft. The first bearing seal is disposed at the first axial housing end. The first bearing seal further forms the second air flow path and the bearing compartment. The second bearing seal is disposed at the second axial housing end. The first bearing seal further forms the second air flow path and the bearing compartment.

In any of the aspects or embodiments described above and herein, the engine may further include a compressor section and a turbine section. The first air flow path may be connected in fluid communication with the compressor section at the first air source. The first outlet plenum may be connected in fluid communication with the turbine section. The housing body may be configured to direct a first compressed bleed air from the compressor section to the turbine section along the first air flow path.

In any of the aspects or embodiments described above and herein, the second air flow path may be connected in fluid communication with the compressor section at the second air source. The housing body may be configured to direct a second compressed bleed air from the compressor section, through the second air flow path, and into the bearing compartment past the first bearing seal and the second bearing seal. The second compressed bleed air may be a different pressure than the first compressed bleed air.

The present disclosure, and all its aspects, embodiments and advantages associated therewith will become more readily apparent in view of the detailed description provided below, including the accompanying drawings.

DETAILED DESCRIPTION

Figure 1:
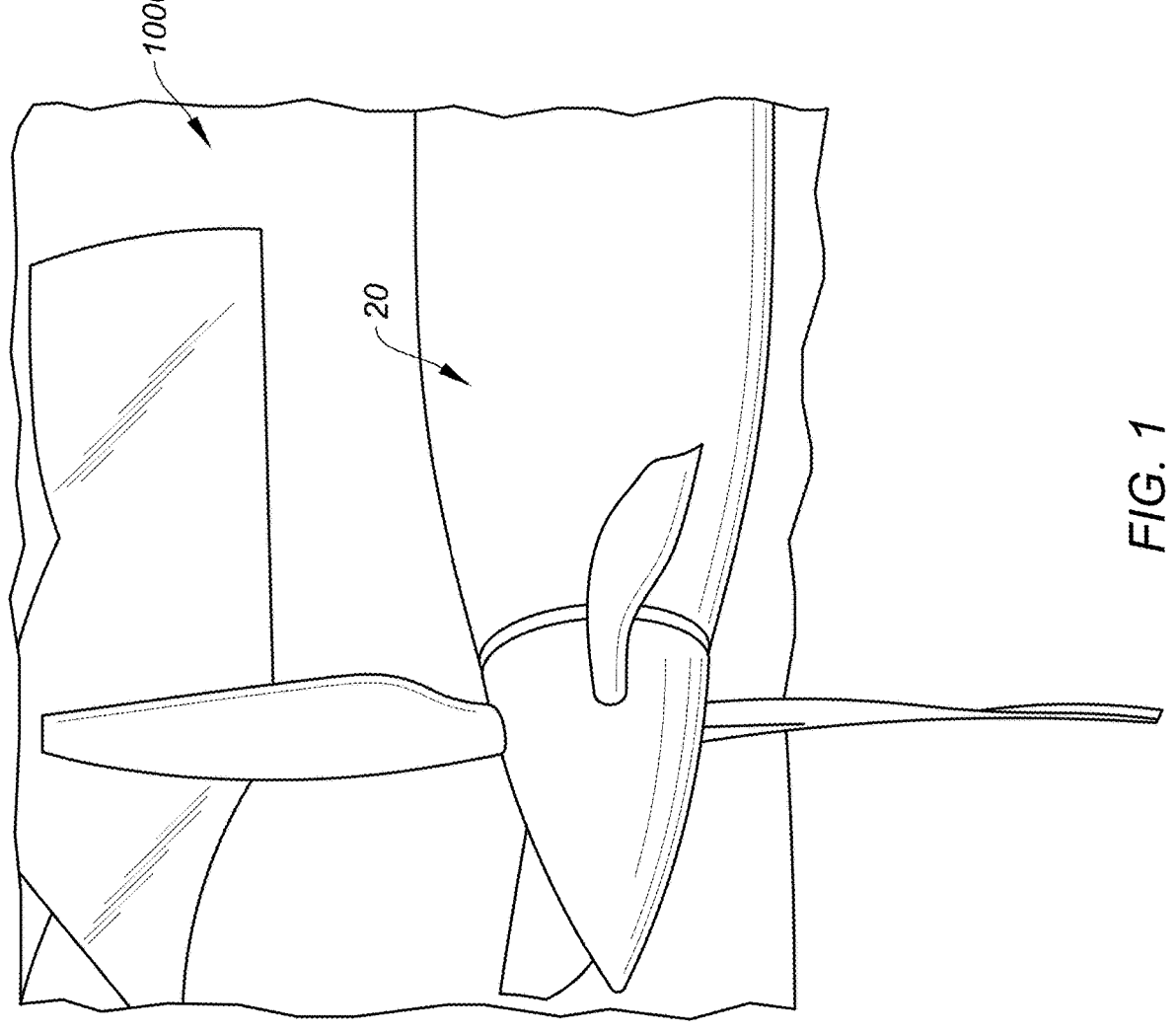
FIG. 1 illustrates an aircraft including a propulsion system, in accordance with one or more embodiments of the present disclosure.

FIG. 1 illustrates an aircraft 1000 including a propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
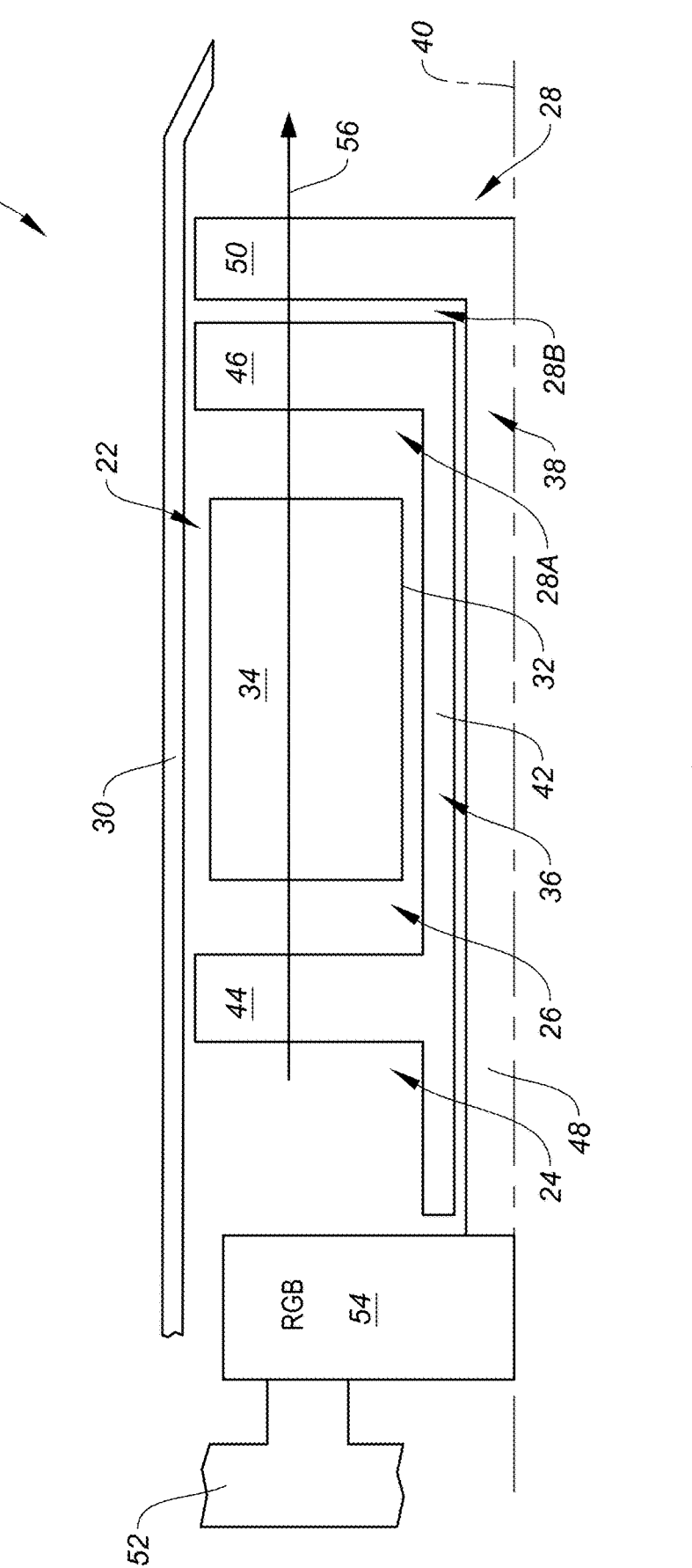
FIG. 2 schematically illustrates a cutaway, side view of an aircraft propulsion system, in accordance with one or more embodiments of the present disclosure.

FIG. 2 schematically illustrates a cutaway, side view of an exemplary configuration of the propulsion system 20. The propulsion system 20 of FIG. 2 includes an engine 22. The engine 22 is configured as a gas turbine engine. In particular, the engine 22 is configured as a turboprop gas turbine engine. However, the present disclosure is not limited to any particular configuration of gas turbine engine for the propulsion assembly 20, and examples of gas turbine engine configurations for the propulsion system 20 may include, but are not limited to, a turbofan engine, a turbojet engine, a propfan engine, or the like.

The engine 22 of FIG. 2 includes a compressor section 24, a combustor section 26, a turbine section 28, and an engine static structure 30. The combustor section 26 includes a combustor 32 (e.g., an annular combustor) forming a combustion chamber 34. The turbine section 28 includes a high-pressure turbine section 28A and a power turbine section 28B.

Components of the compressor section 24 and the turbine section 28 of FIG. 2 form a first rotational assembly 36 (e.g., a high-pressure spool) and a second rotational assembly 38 of the engine 22. The first rotational assembly 36 and the second rotational assembly 38 are mounted for rotation about a rotational axis 40 (e.g., an axial centerline) of the engine 22 relative to the engine static structure 30.

The first rotational assembly 36 includes a first shaft 42, a bladed compressor rotor 44 for the compressor section 28, and a bladed first turbine rotor 46 for the high-pressure turbine section 28A. The first shaft 42 interconnects the bladed compressor rotor 44 and the bladed first turbine rotor 46.

The second rotational assembly 38 includes a second shaft 48 and a bladed second turbine rotor 50 for the power turbine section 28B. The second shaft 48 is connected to the bladed second turbine rotor 50. The second shaft 48 operably connects (e.g., directly or indirectly connects) the bladed second turbine rotor 50 with a propulsor 52 of the propulsion system 20. As shown in FIG. 2, for example, the second shaft 48 may be coupled with the propulsor 52 by a reduction gear box 54. The reduction gear box 54 may include a gear assembly (e.g., an epicyclic gear assembly) configured to drive the propulsor 52 at a reduced rotational speed relative to the second shaft 48. Of course, the second shaft 48 may alternatively be directly connected to the propulsor 52 to drive the propulsor 52 at the same rotational speed as the second shaft 48.

The engine static structure 30 includes engine casings, cowlings, and other fixed (e.g., non-rotating) structures of the engine 22 which house and/or support components of the engine 22 such as, but not limited to, those of the compressor section 24, the combustor section 26, and the turbine section 28. The engine static structure 30 further includes one or more bearing assemblies configured to rotationally support components of the first rotational assembly 36 and the second rotational assembly 38.

During operation of the propulsion system 20 of FIG. 2, ambient air enters the propulsion system 20 through an air intake into and through a core flow path 56 of the engine 22. The ambient air flow along the core flow path 56 is compressed in the compressor section 24 and directed into the combustion chamber 34 of the combustor 32 within the combustor section 26. Fuel is injected into the combustion chamber 34 and mixed with the compressed air to provide a fuel-air mixture. This fuel-air mixture is ignited, and combustion products thereof flow through the high-pressure turbine section 28A and the power turbine section 28B and are exhausted from the propulsion system 20. The bladed first turbine rotor 46 and the bladed second turbine rotor 50 rotationally drive the first rotational assembly 36 and the second rotational assembly 38, respectively, in response to the combustion gas flow through the high-pressure turbine section 28A and the power turbine section 28B.

Figure 3:
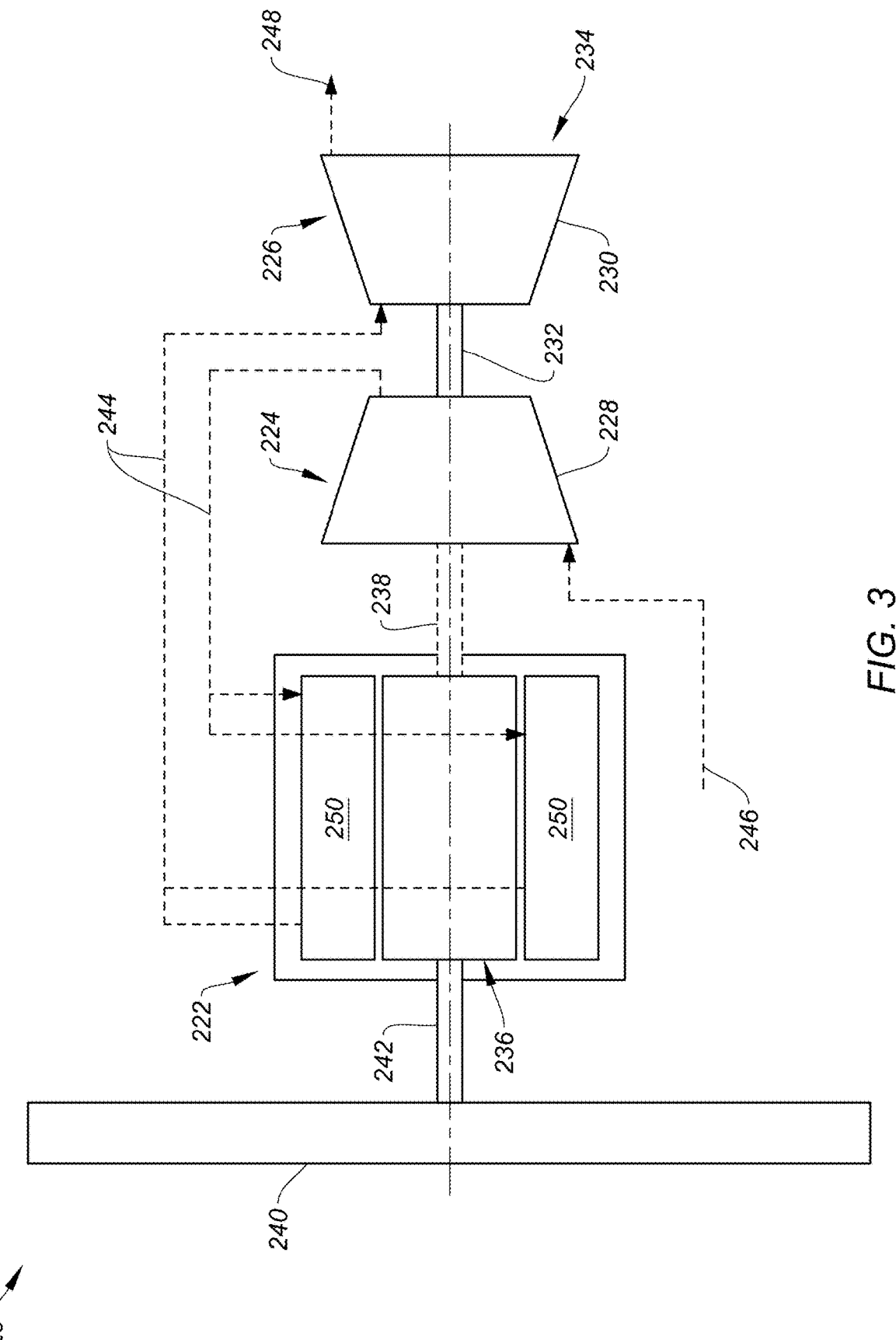
FIG. 3 schematically illustrates a cutaway, side view of another aircraft propulsion system, in accordance with one or more embodiments of the present disclosure.

FIG. 3 schematically illustrates a cutaway, side view of another exemplary configuration of the propulsion system 20. The propulsion system 20 of FIG. 3 may be configured with a turbocharged or turbo-compound engine. The propulsion system 20 of FIG. 3 includes an engine 222, a compressor section 224 (e.g., an engine compressor), and a turbine section 226 (e.g., an engine turbine). The engine 222 is configured as an intermittent internal combustion engine such as, but not limited to, a rotary engine or a reciprocating piston engine. An example of the rotary engine is a Wankel engine. Examples of the reciprocating piston engine include a radial engine, an inline (I) engine, a V-engine, and a W-engine. The compressor section 224 includes a bladed compressor rotor 228. The turbine section 226 includes a bladed turbine rotor 230. The bladed turbine rotor 230 is coupled to and rotatable with the bladed compressor rotor 228. The bladed turbine rotor 230 of FIG. 3, for example, is connected to the bladed compressor rotor 228 through a shaft 232. At least (or only) a combination of the bladed compressor rotor 228, the bladed turbine rotor 230, and the shaft 232 may collectively form a turbo-compressor rotational assembly 234 (e.g., a spool). This turbo-compressor rotational assembly 234 may be rotationally discrete from an engine rotational assembly 236 of the engine 222. Alternatively, the turbo-compressor rotational assembly 234 may be operatively coupled to and rotatable with the engine rotational assembly 236 through a drive train 238. The drive train 238 may be configured as a direct drive train or a geared drive train. The engine rotational assembly 236 is coupled to and rotatable with a propulsor 240 (e.g., a propeller) of the propulsion system 20 of FIG. 3 by a drive train 242. The drive train 242 may be configured as a direct drive train or a geared drive train.

The propulsion system 20 of FIG. 3, including the engine 222, the compressor section 224, and the turbine section 226, forms a flow path 244 (e.g., a core flowpath). This flow path 244 extends from an inlet 246 into the propulsion system 20 to a combustion products exhaust 248 from the propulsion system 20. More particularly, the flow path 244 extends sequentially through the compressor section 224, through one or more combustion zones 250 (e.g., combustion chambers, cylinder chambers, etc.) within the engine 222, and through the turbine section 226 from the inlet 246 to the exhaust 248. With this arrangement, air delivered to the engine 222 is compressed by the bladed compressor rotor 228, and combustion products produced by combustion of a mixture of the compressed air and fuel within the combustion zone(s) 250 drive rotation of the turbo-compressor rotational assembly 234 and the bladed turbine rotor 230, for example, about a rotational axis 252 of the turbo-compressor rotational assembly 234. Combustion of the fuel within the combustion zone(s) 250 further drives rotation of the engine rotational assembly 236. The rotation of the engine rotational assembly 236 drives rotation of the propulsor 240. The rotation of the bladed turbine rotor 230 drives rotation of the bladed compressor rotor 228 to facilitate the compression of the incoming air to the engine 222. The rotation of the bladed turbine rotor 230 may also assist driving rotation of the engine rotational assembly 236 where the turbo-compressor rotational assembly 234 is coupled to the engine rotational assembly 236 through the optional direct drive or geared drive train 238.

Figure 4:
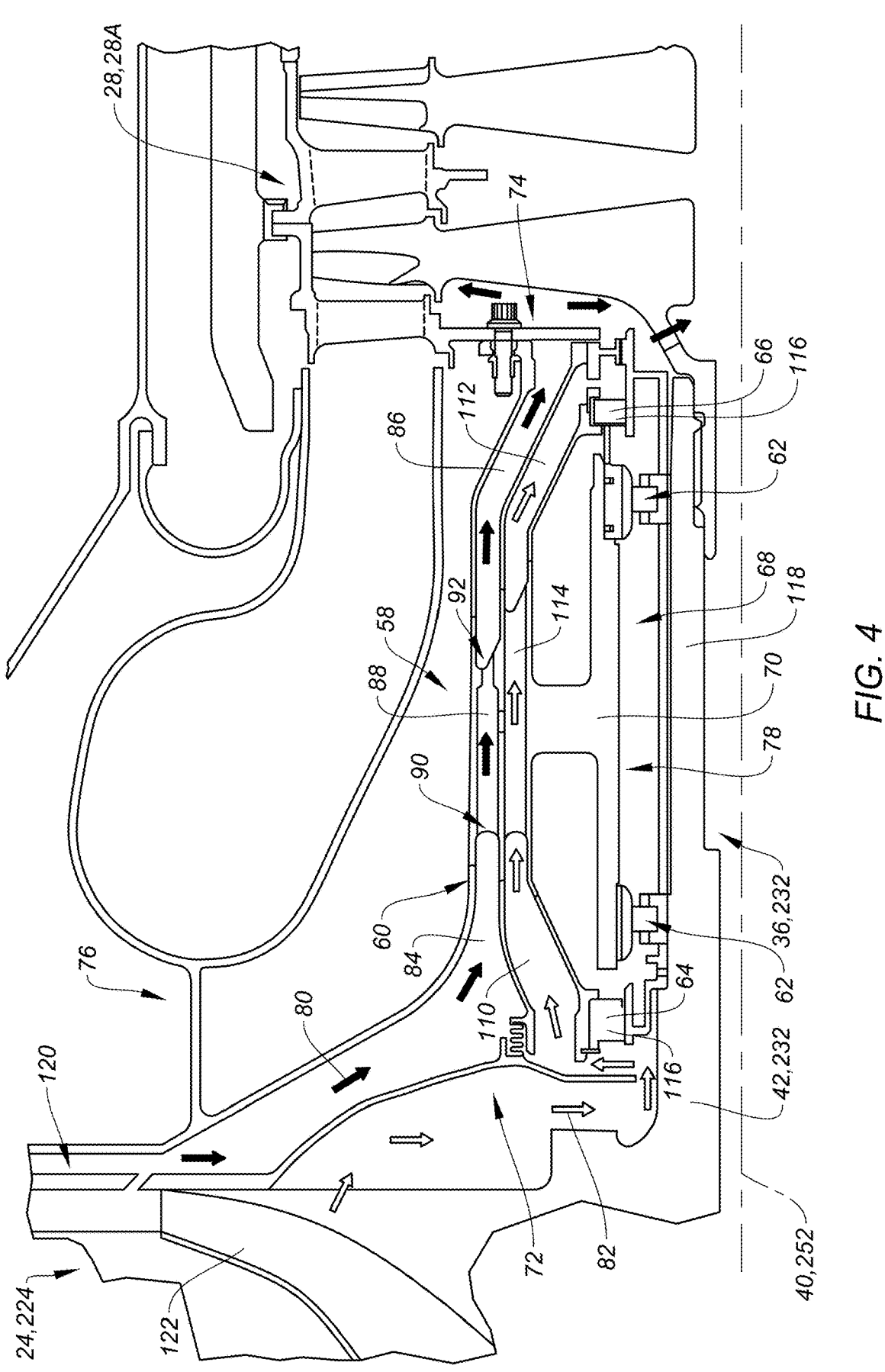
FIG. 4 illustrates a cutaway, side view of a portion of a rotational assembly and a bearing assembly for the aircraft propulsion system, in accordance with one or more embodiments of the present disclosure.
Figure 5:
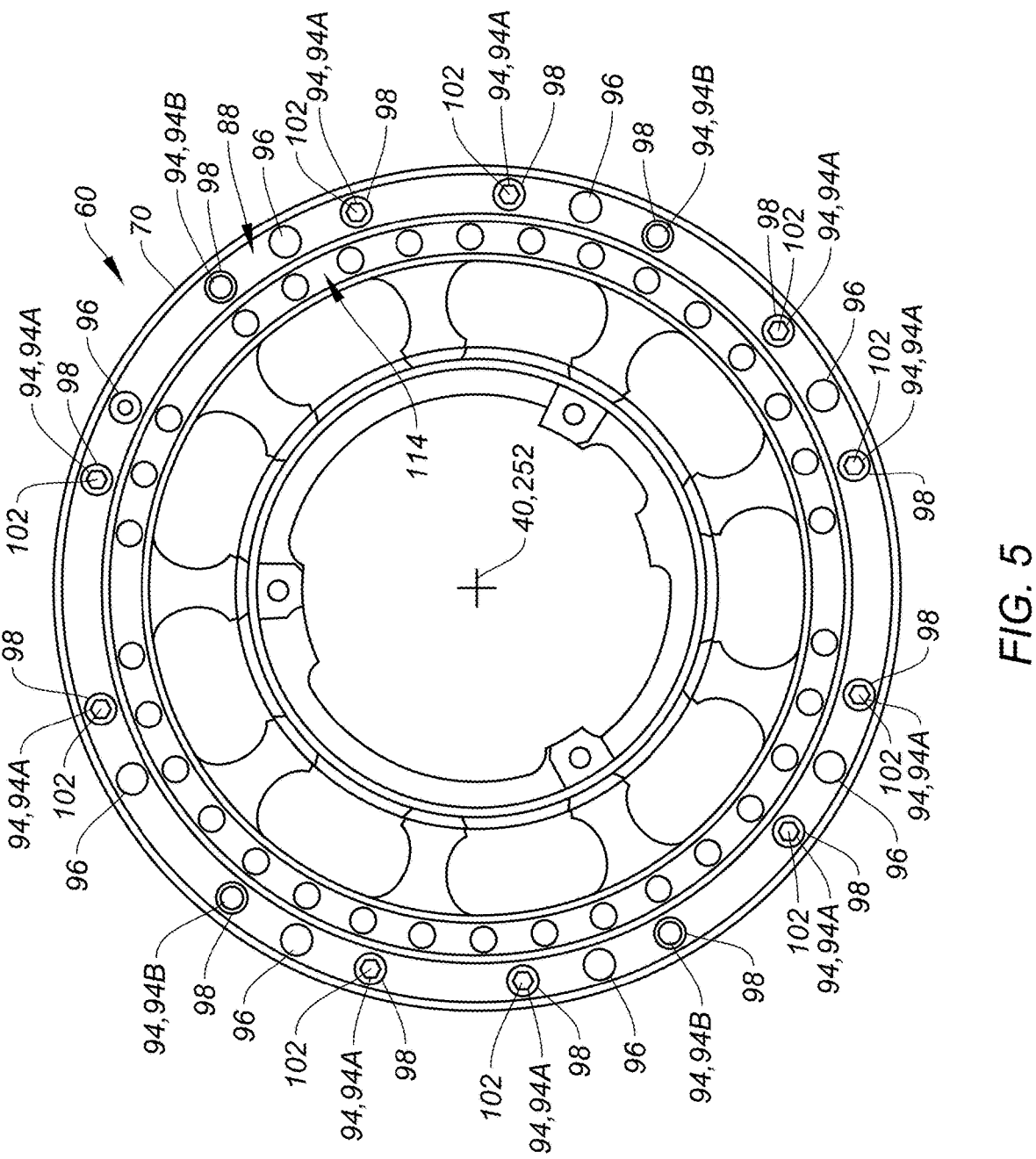
FIG. 5 illustrates a front view of a bearing compartment housing for the bearing assembly, in accordance with one or more embodiments of the present disclosure.

FIG. 4 illustrates a cutaway, side view of a bearing assembly 58 of the propulsion system 20 (see FIGS. 2 and 3). The bearing assembly 58 of FIG. 4 may be configured to rotationally support the first rotational assembly 36 (e.g., the first shaft 42) (see FIG. 2). Alternatively, the bearing assembly 58 may be configured to rotationally support the turbo-compressor rotational assembly 234 (see FIG. 3). The bearing assembly 58 includes a bearing compartment housing 60, one or more bearings 62, a first bearing seal 64, and a second bearing seal 66. FIG. 5 illustrates a front view of the bearing compartment housing 60.

The housing 60 surrounds and forms a bearing compartment 68 of the bearing assembly 58. The housing 60 is configured to direct compressed air (e.g., air from the compressor section 24, 224) to the bearing compartment 68 as well as other components of the propulsion system 20 such as, but not limited to, the turbine section 28, 226. The housing 60 supports the bearings 62 in rotational communication with the first rotational assembly 36.

The housing 60 includes an annular housing body 70. The housing body 70 extends circumferentially about (e.g., completely around) the rotational axis 40, 252. The housing body 70 extends axially between and to a first axial end 72 of the housing body 70 and a second axial end 74 of the housing body 70. The first axial end 72 may be disposed at (e.g., on, adjacent, or proximate) the compressor section 24, 224. The second axial end 74 may be disposed at (e.g., on, adjacent, or proximate) the turbine section 28, 226. The housing body 70 may be mounted to one or more static structure components (e.g., casings) of the compressor section 24, 224 and/or the turbine section 28, 226 at (e.g., on, adjacent, or proximate) the first axial end 72 and/or the second axial end 74, respectively. The housing body 70 extends radially between and to an outer radial end 76 of the housing body 70 and an inner radial end 78 of the housing body 70.

The housing body 70 forms a first air flow path 80 and a second air flow path 82 through the housing 60. The first air flow path 80 of FIGS. 4 and 5 is disposed radially outward of the second air flow path 82 of FIGS. 4 and 5. The present disclosure, however, is not limited to this particular orientation of the first air flow path 80 and the second air flow path 82. The first air flow path 80 may be independent of (e.g., fluidly isolated from) the second air flow path 82 through the housing 60.

The housing body 70 forms an inlet plenum 84, an outlet plenum 86, and a plurality of feed holes 88 forming the first air flow path 80. The housing body 70 forms the inlet plenum 84 at (e.g., on, adjacent, or proximate) the first axial end 72. The inlet plenum 84 is connected in fluid communication with a first air source. For example, the inlet plenum 84 may be connected in fluid communication with the compressor section 24, 224 at the first air source (e.g., a stage, outlet, or other portion of an air flow path through the compressor section 24, 224). The inlet plenum 84 may be configured as an annular plenum extending circumferentially about (e.g., completely around) the rotational axis 40, 252. The housing body 70 forms the outlet plenum 86 at (e.g., on, adjacent, or proximate) the second axial end 74. The outlet plenum 86 is connected in fluid communication with the turbine section 28, 226 (e.g., the high-pressure turbine section 28A). The outlet plenum 86 may be configured as an annular plenum extending circumferentially about (e.g., completely around) the rotational axis 40, 252. The housing body 70 forms the feed holes 88 between (e.g., axially between) the inlet plenum 84 and the outlet plenum 86. Each of the feed holes 88 extends (e.g., axially extends) between and connects the inlet plenum 84 and the outlet plenum 86 in fluid communication. The feed holes 88 are circumferentially arrayed about the rotational axis 40, 252 as shown, for example, in FIG. 5. Each of the feed holes 88 extends (e.g., axially extends) between and to a first axial end 90 of each respective feed hole 88 and a second axial end 92 of each respective feed hole 88. The first axial end 90 is disposed at (e.g., on, adjacent, or proximate) the inlet plenum 84. The second axial end 92 is disposed at (e.g., on, adjacent, or proximate) the outlet plenum 86. The housing body 70 may form the inlet plenum 84 and the feed holes 88 such that the feed holes 88 are axially unobstructed (e.g., by the housing body 70) from the first axial end 72 to the first axial end 90.

Figure 6:
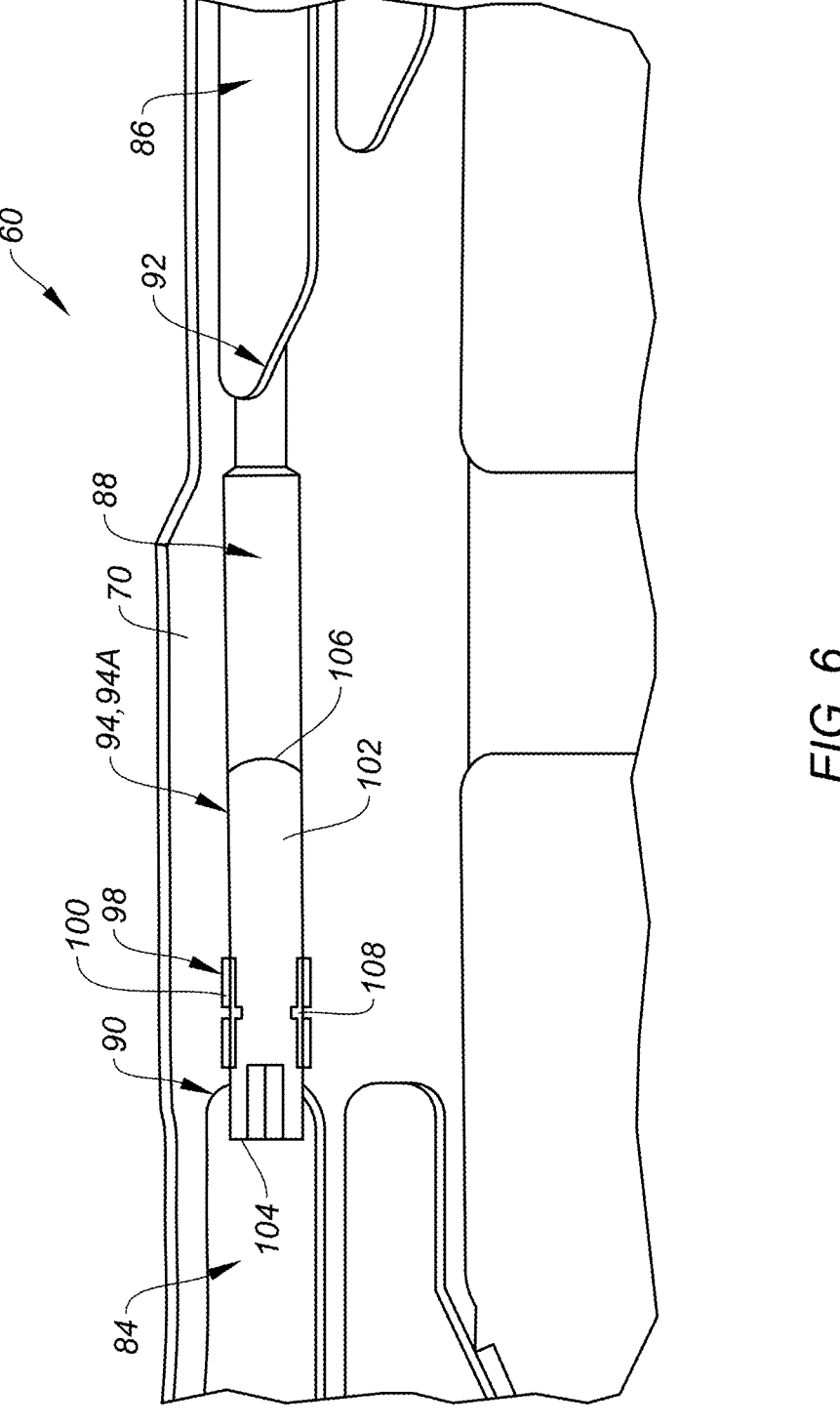
FIG. 6 illustrates a cutaway, side view of a portion of the bearing compartment housing including a feed hole and a feed hole plug, in accordance with one or more embodiments of the present disclosure.

The feed holes 88 of FIGS. 4 and 5 include one or more first feed holes 94 (e.g., a first subset of the feed holes 88) and one or more second feed holes 96 (e.g., a second subset of the feed holes 88). Each of the first feed holes 94 is a threaded feed hole and each of the second feed holes 96 is an unthreaded feed hole (e.g., a feed hole which does not include a threading interface). FIG. 6 illustrates a cutaway, side view of a portion of the housing body 70 including one of the first feed holes 94. Each of the first feed holes 94 includes a threading interface 98 (e.g., a helical threading). The threading interface 98 may be disposed at (e.g., on, adjacent, or proximate) the first axial end 90. The threading interface 98 of FIG. 6 is formed by a threading insert 100 mounted within the housing body 70 and circumscribing a respective one of the first feed holes 94. Examples of the threading insert 100 include, but are not limited to, those threaded inserts sold by Böllhoff Produktion GmbH (Bielefeld, Germany) under its HELI-COIL® and HELI-COIL® trademarks. Alternatively, the threading interface 98 may be formed by the housing body 70. The first feed holes 94 and the second feed holes 96 may be circumferentially arrayed about the rotational axis 40, 252 as shown, for example, in FIG. 5. In some embodiments, each of the feed holes 88 may be threaded feed holes. In other words, all of the feed holes 88 may be the first feed holes 94.

The housing 60 includes one or more feed hole plugs 102. Each of the feed hole plugs 102 may be configured as a threaded fastener extending between and to a first axial end 104 of each of the feed hole plugs 102 and a second axial end 106 of each of the feed hole plugs 102. Each of the feed hole plugs 102 includes a threading interface 108 configured for threaded engagement with the threading interface 98. The feed hole plugs 102 may have a headless configuration on the first axial end 104 (e.g., the feed hole plugs 102 may not include a radially-enlarged head portion). The headless configuration of the feed hole plugs 102 may facilitate a reduction in the radial envelope of the feed hole plugs 102 within the constrained space of the housing 60. However, the feed hole plugs 102 may alternatively include a radially-enlarged head portion on the first axial end 104. Each of the feed hole plugs 102, installed in a respective one of the first feed holes 94, obstructs all or substantially all air flow through the respective one of the first feed holes 94.

The feed hole plugs 102 may be installed in none, some, or all of the first feed holes 94 to facilitate control of air flow along the first air flow path 80. As shown in FIG. 5, for example, the first feed holes 94 and the feed hole plugs 102 may form one or more obstructed feed holes 94A of the first feed holes 94 and one or more unobstructed feed holes 94B of the first feed holes 94. All or substantially all air flow into and through the obstructed feed holes 94A (e.g., from the inlet plenum 84 to the outlet plenum 86) may be obstructed (e.g., by the feed hole plugs 102). In contrast, air flow along the first air flow path 80 may be directed from the inlet plenum 84 to the outlet plenum 86 through the unobstructed feed holes 94B and the second feed holes 96.

The housing body 70 forms an inlet plenum 110, an outlet plenum 112, and a plurality of feed holes 114 forming the second air flow path 82. The housing body 70 forms the inlet plenum 110 at (e.g., on, adjacent, or proximate) the first axial end 72. The inlet plenum 110 is connected in fluid communication with a second air source, which second air source is different than the first air source connected in fluid communication with the inlet plenum 84. For example, the inlet plenum 110 may be connected in fluid communication with the compressor section 24, 224 at the second air source (e.g., a stage, outlet, or other portion of an air flow path through the compressor section 24, 224). The inlet plenum 110 may be configured as an annular plenum extending circumferentially about (e.g., completely around) the rotational axis 40, 252. The housing body 70 forms the outlet plenum 112 at (e.g., on, adjacent, or proximate) the second axial end 74. The outlet plenum 112 is connected in fluid communication with the bearing compartment 68. The outlet plenum 112 may be configured as an annular plenum extending circumferentially about (e.g., completely around) the rotational axis 40, 252. The housing body 70 forms the feed holes 114 between (e.g., axially between) the inlet plenum 110 and the outlet plenum 112. Each of the feed holes 114 extends (e.g., axially extends) between and connects the inlet plenum 110 and the outlet plenum 112 in fluid communication.

Each of the bearings 62 is mounted to the housing body 70 (e.g., the inner radial end 78) within the bearing compartment 68. Each of the bearings 62 is engaged with the first rotational assembly 36 to rotationally support the first rotational assembly 36. For example, each of the bearings 62 may be directly engaged with the first shaft 42 or with one or more intermediate shaft components of the first rotational assembly 36.

The first bearing seal 64 and the second bearing seal 66 are mounted on or otherwise supported by the housing body 70. The first bearing seal 64 and the second bearing seal 66 may each include a carbon seal 116 (e.g., an annular carbon seal) configured for sealing engagement with a shaft 118 such as, but not limited to, the shaft 42 or the shaft 232 (see FIGS. 2 and 3). The present disclosure, however, is not limited to the inclusion of a carbon seal for the first bearing seal 64 and the second bearing seal 66. The first bearing seal 64 is disposed at (e.g., on, adjacent, or proximate) the first axial end 72 and the inner radial end 78. The first bearing seal 64 is positioned in sealing engagement with the shaft 118, for example, to seal a first axial end (e.g., a forward end) of the bearing compartment 68. The second bearing seal 66 is disposed at (e.g., on, adjacent, or proximate) the second axial end 74 and the inner radial end 78. The second bearing seal 66 is positioned in sealing engagement with the shaft 118, for example, to seal a second axial end (e.g., an aft end) of the bearing compartment 68. The first bearing seal 64 and the second bearing seal 66 are positioned along and in fluid communication with the second air flow path 82. The first bearing seal 64 and the second bearing seal 66 are separated from the first air flow path 80 by the second airflow path 82 and the housing body 70.

During operation of the propulsion system 20 (see FIGS. 2 and 3), compressed bleed air from the compressor section 24, 224 is directed through the housing 60 along the first air flow path 80. The compressed bleed air along the first air flow path 80 may be directed from an outlet or intermediate compressor stage of the compressor section 24, 224. For example, the first air flow path 80 is connected in fluid communication with a compressor diffuser 120 of the compressor section 24, 224 to receive the compressed bleed air. This compressed bleed air from the compressor diffuser 120 may be referred to as "P3" air. The compressed bleed air along the first air flow path 80 is directed by the housing body 70 to the turbine section 28, 226 (e.g., the high-pressure turbine section 28A), for example, to facilitate cooling of the bladed first turbine rotor 46 and other turbine section 28 components. The configuration of the first feed holes 94 and the feed hole plugs 102 facilitates control of a flow rate of the compressed bleed air supplied to the turbine section 28, 226 by allowing the flow rate of the compressed bleed air to be selectively aligned with the requirements of the propulsion system 20 in which the housing 60 is installed. For example, a technician may install a selected quantity of the feed hole plugs 102 into one or more respective holes of the first feed holes 94 to form the obstructed feed holes 94A and the unobstructed feed holes 94B for the particular propulsion system 20 in which the housing 60 is installed. The housing 60 may, therefore, facilitate control of the supply of compressed bleed air to the turbine section 28, 226 for a plurality of different propulsion system 20 configurations (e.g., different engine or turbo-compressor models) having different turbine section 28, 226 cooling needs, while using a same housing body 70.

Compressed bleed air from the compressor section 24, 224 is also directed through the housing 60 along the second air flow path 82. The compressed bleed air along the second air flow path 82 may be directed from an intermediate compressor stage of the compressor section 24, 224. The compressed air along the second air flow path 82 may be supplied from a compressor stage which is upstream of the outlet or compressor stage supplying the compressed bleed air (e.g., the P3 air) to the first air flow path 80. In other words, the compressed bleed air supplied to the first air flow path 80 may have a greater pressure than the compressed bleed air supplied to the second air flow path 82. For example, the second air flow path 82 may be connected in fluid communication with the compressor section 24, 224 at an impeller 122 (e.g., a portion of a bladed compressor rotor) of the compressor section 24, 224. This compressed bleed air may be referred to as "P2.9" air. The compressed bleed air (e.g., the P2.9 air) along the second air flow path 82 is used to facilitate sealing of the bearing compartment 68 (e.g., in combination with the first bearing seal 64). This compressed bleed air flows along the second air flow path 82 into and through the outlet plenum 112 where the compressed bleed air is used to facilitate sealing of the bearing compartment 68 (e.g., in combination with the second bearing seal 66). The compressed bleed air along the second air flow path 82 is further directed into the bearing compartment 68, for example, to facilitate buffering and cooling of the bearing compartment 68 and bearing assembly 58 components therein. The multiple layers of cooling air provided by the first air flow path 80 and the second air flow path 82 facilitate more precise control of bearing compartment 68 temperatures (e.g., oil temperatures), while also adding redundancy and increased reliability for bearing compartment 68 cooling.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An engine for an aircraft propulsion system, the engine comprising:

a rotational assembly including a shaft, and the shaft is rotatable about a rotational axis; and a bearing assembly including a bearing compartment housing and at least one bearing, the bearing compartment housing surrounds and forms a bearing compartment, the bearing compartment housing includes a housing body, the housing body extends circumferentially about the rotational axis, the housing body extends axially between and to a first axial housing end and a second axial housing end, the housing body forms a first air flow path and a second air flow path through the bearing compartment housing, the first air flow path extending through the housing body from a first inlet plenum of the first air flow path to a first outlet plenum of the first air flow path, the first air flow path connected in fluid communication with a first air source, and the second air flow path extending through the housing body from a second inlet plenum of the second air flow path to a second outlet plenum of the second air flow path, the second air flow path disposed between and separating the first air flow path and the bearing compartment, the second air flow path connected in fluid communication with a second air source, and the at least one bearing is mounted to the housing body and disposed within the bearing compartment, and the at least one bearing is rotationally engaged with the shaft;

wherein the first air flow path includes a plurality of first air flow path feed holes connecting the first inlet plenum in fluid communication with the first outlet plenum; and wherein the bearing compartment housing includes at least one feed hole plug, the plurality of first air flow path feed holes includes a plurality of first feed holes and a plurality of second feed holes connecting the first inlet plenum in fluid communication with the first outlet plenum, the plurality of first feed holes includes at least one obstructed feed hole and at least one unobstructed feed hole, each of the at least one feed hole plug is disposed within a respective one of the at least one obstructed feed hole to obstruct air flow through the respective one of the at least one obstructed feed hole along the first air flow path.

2. The engine of claim 1, wherein the bearing assembly further includes a first bearing seal and a second bearing seal, the first bearing seal is disposed at the first axial housing end, the second bearing seal is disposed at the second axial housing end, the first bearing seal and the second bearing seal further form the bearing compartment, and the first bearing seal and the second bearing seal are disposed at the second air flow path.

3. The engine of claim 2, further comprising a compressor section, the second air flow path is connected in fluid communication with the compressor section at the second air source, and the housing body is configured to direct a second compressed bleed air from the compressor section, through the second air flow path, and into the bearing compartment past the first bearing seal and the second bearing seal.

4. The engine of claim 1, further comprising a compressor section and a turbine section, the first air flow path is connected in fluid communication with the compressor section at the first air source, the first outlet plenum is connected in fluid communication with the turbine section, and the housing body is configured to direct a first compressed bleed air from the compressor section to the turbine section along the first air flow path.

5. The engine of claim 4, wherein the second air flow path is connected in fluid communication with the compressor section at the second air source, and the housing body is configured to direct a second compressed bleed air from the compressor section, through the second air flow path, and into the bearing compartment, and the second compressed bleed air is a different pressure than the first compressed bleed air.

6. The engine of claim 5, wherein the first compressed bleed air has a greater pressure than the second compressed bleed air.

7. The engine of claim 1, wherein the first air flow path is independent of the second air flow path through the bearing compartment housing.

8. The engine of claim 1, wherein each of the first inlet plenum, the first outlet plenum, the second inlet plenum, and the second outlet plenum is an annular plenum.

9. The engine of claim 1, wherein the second air flow path includes a plurality of second air flow path feed holes connecting the second inlet plenum in fluid communication with the second outlet plenum.

10. An engine for an aircraft propulsion system, the engine comprising:
   a compressor section including a first air source and a second air source;
   a turbine section;
   a rotational assembly including a bladed compressor rotor for the compressor section, a bladed turbine rotor for the turbine section, and a shaft interconnecting the bladed compressor rotor and the bladed turbine rotor, and the rotational assembly is rotatable about a rotational axis; and
   a bearing assembly including a bearing compartment housing and at least one bearing, the bearing compartment housing surrounds and forms a bearing compartment, the bearing compartment housing includes a housing body, the housing body extends circumferentially about the rotational axis, the housing body extends axially between and to a first axial housing end and a second axial housing end, the housing body forms a first air flow path and a second air flow path through the bearing compartment housing,
      the first air flow path extending through the housing body from a first inlet plenum of the first air flow path to a first outlet plenum of the first air flow path, and the first air flow path is connected in fluid communication with and between the first air source and the turbine section, and
      the second air flow path extending through the housing body from a second inlet plenum of the second air flow path to a second outlet plenum of the second air flow path, the second air flow path is connected in fluid communication with and between the second air source and the bearing compartment, and the first air flow path is independent of the second air flow path through the bearing compartment housing, and
   the at least one bearing is mounted to the housing body and disposed within the bearing compartment, and the at least one bearing is rotationally engaged with the shaft;
   wherein the first air flow path is connected in fluid communication with the first air source at a first position of the compressor section to receive a first compressed bleed air, and the second air flow path is connected in fluid communication with the second air source at a second position of the compressor section, upstream of the first position, to receive a second compressed bleed air; and
   wherein the first compressed bleed air has a greater pressure than the second compressed bleed air.

11. The engine of claim 10, wherein the bearing assembly further includes a first bearing seal and a second bearing seal, the first bearing seal is disposed at the first axial housing end, the second bearing seal is disposed at the second axial housing end, the first bearing seal and the second bearing seal further form the bearing compartment, and the first bearing seal and the second bearing seal are disposed at the second air flow path.

12. The engine of claim 10, wherein the first air flow path includes a plurality of first air flow path feed holes connecting the first inlet plenum in fluid communication with the first outlet plenum.

13. The engine of claim 12, wherein the second air flow path includes a plurality of second air flow path feed holes connecting the second inlet plenum in fluid communication with the second outlet plenum.

14. An engine for an aircraft propulsion system, the engine comprising:
   a rotational assembly including a shaft, and the shaft is rotatable about a rotational axis; and
   a bearing assembly including a bearing compartment housing, at least one bearing, a first bearing seal, and a second bearing seal,
      the bearing compartment housing surrounds and forms a bearing compartment, the bearing compartment housing includes a housing body, the housing body extends circumferentially about the rotational axis, the housing body extends axially between and to a first axial housing end and a second axial housing end, the housing body extends radially between and to an inner radial end and an outer radial end, the housing body includes a plurality of first feed holes forming a first air flow path through the bearing compartment housing and a plurality of second feed holes forming a second air flow path through the bearing compartment housing,
      the first air flow path extending through the housing body from a first inlet plenum of the first air flow path to a first outlet plenum of the first air flow path, the plurality of first feed holes being axially between the first inlet plenum and the first outlet plenum, and the first air flow path connected in fluid communication with a first air source, and the second air flow path extending through the housing body from a second inlet plenum of the second air flow path to a second outlet plenum of the second air flow path, the second air flow path is disposed radially between the first air flow path and the bearing compartment from the second inlet plenum to the second outlet plenum, the plurality of second feed holes being axially between the second inlet plenum and the second outlet plenum, and the second air flow path connected in fluid communication with a second air source, the at least one bearing is mounted to the housing body and disposed within the bearing compartment, and the at least one bearing is rotationally engaged with the shaft, the first bearing seal is disposed at the first axial housing end, and the first bearing seal further forms the second air flow path and the bearing compartment, the second bearing seal is disposed at the second axial housing end, and the first bearing seal further forms the second air flow path and the bearing compartment, and the plurality of first feed holes and the plurality of second feed holes are parallel to each other, and the first outlet plenum and the second outlet plenum are parallel to each other.

15. The engine of claim 14, further comprising a compressor section and a turbine section, the first air flow path is connected in fluid communication with the compressor section at the first air source, the first outlet plenum is connected in fluid communication with the turbine section, and the housing body is configured to direct a first compressed bleed air from the compressor section to the turbine section along the first air flow path.

16. The engine of claim 15, wherein the second air flow path is connected in fluid communication with the compressor section at the second air source, and the housing body is configured to direct a second compressed bleed air from the compressor section, through the second air flow path, and into the bearing compartment past the first bearing seal and the second bearing seal, and the second compressed bleed air is a different pressure than the first compressed bleed air.

\* \* \* \* \*